United States Patent
Seo

(10) Patent No.: US 7,500,124 B2
(45) Date of Patent: Mar. 3, 2009

(54) ELECTRONIC DEVICES AND OPERATIONAL METHODS THAT CHANGE CLOCK FREQUENCIES THAT ARE APPLIED TO A CENTRAL PROCESSING UNIT AND A MAIN SYSTEM BUS

(75) Inventor: Hyoung-Min Seo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 395 days.

(21) Appl. No.: 11/132,127

(22) Filed: May 18, 2005

(65) Prior Publication Data

US 2005/0278561 A1    Dec. 15, 2005

(30) Foreign Application Priority Data

Jun. 11, 2004    (KR)    .................... 10-2004-0043009

(51) Int. Cl.
*G06G 1/00*    (2006.01)
(52) U.S. Cl. ...................................... 713/322; 713/300
(58) Field of Classification Search ................. 713/322, 713/300
See application file for complete search history.

(56) References Cited

U.S. PATENT DOCUMENTS

| | | | | |
|---|---|---|---|---|
| 5,167,024 A * | 11/1992 | Smith et al. | ................. | 713/322 |
| 5,745,375 A * | 4/1998 | Reinhardt et al. | ........... | 700/286 |
| 5,812,860 A * | 9/1998 | Horden et al. | .............. | 713/322 |
| 5,935,253 A * | 8/1999 | Conary et al. | ............... | 713/322 |
| 5,987,614 A * | 11/1999 | Mitchell et al. | ............. | 713/300 |
| 6,269,043 B1 * | 7/2001 | Batcher | ....................... | 365/227 |
| 6,345,364 B1 * | 2/2002 | Lee | ............................. | 713/324 |
| 6,397,053 B1 | 5/2002 | Ghiazza | | |
| 6,425,086 B1 * | 7/2002 | Clark et al. | ................. | 713/322 |
| 6,457,082 B1 * | 9/2002 | Zhang et al. | ................ | 710/260 |
| 6,519,706 B1 | 2/2003 | Ogoro | | |
| 6,519,707 B2 * | 2/2003 | Clark et al. | ................. | 713/322 |
| 6,694,442 B2 * | 2/2004 | Yeh | ............................ | 713/322 |
| 6,845,462 B2 * | 1/2005 | Yatsuda et al. | .............. | 713/501 |

(Continued)

FOREIGN PATENT DOCUMENTS

JP    11-224233 A    8/1999

(Continued)

OTHER PUBLICATIONS

Notice to Submit Response and English-language translation, KR Application No. 10-2004-0043009, Jan. 9, 2006.

*Primary Examiner*—Thomas Lee
*Assistant Examiner*—Vincent T Tran
(74) *Attorney, Agent, or Firm*—Myers Bigel Sibley & Sajovec

(57) ABSTRACT

An electronic device includes a central processing unit (CPU) and a main system bus. The central processing unit operates at a first clock frequency and the main system bus operates at a second clock frequency that is lower than the first clock frequency, responsive to the electronic device being in an active mode. Both the central processing unit and the main system bus are operated at a third clock frequency that is lower than the second clock frequency, responsive to the electronic device being in an idle mode. An operating voltage of the central processing unit also may be decreased responsive to the electronic device being in the idle mode.

17 Claims, 7 Drawing Sheets

U.S. PATENT DOCUMENTS

| | | | |
|---|---|---|---|
| 7,069,463 B2 * | 6/2006 | Oh | 713/503 |
| 7,093,153 B1 * | 8/2006 | Witek et al. | 713/600 |
| 7,096,373 B2 * | 8/2006 | Oh | 713/320 |
| 7,167,996 B2 * | 1/2007 | Takahashi et al. | 713/600 |
| 7,237,128 B2 * | 6/2007 | Naveh et al. | 713/322 |
| 7,254,721 B1 * | 8/2007 | Tobias et al. | 713/300 |
| 2002/0083356 A1 | 6/2002 | Dai | |
| 2002/0104036 A1 * | 8/2002 | Sakamoto et al. | 713/500 |
| 2003/0023890 A1 | 1/2003 | Na et al. | |
| 2004/0193934 A1 * | 9/2004 | Kahn | 713/500 |
| 2005/0024365 A1 * | 2/2005 | Ohba | 345/501 |

FOREIGN PATENT DOCUMENTS

| | | |
|---|---|---|
| JP | 2000-122747 A | 4/2000 |
| KR | 2003-0010408 A | 2/2003 |
| KR | 10-0382232 B1 | 4/2003 |

* cited by examiner

FIG. 7

| CLOCK | | 400MHz (400:133:67.5) | | 400MHz (400:67.5:67.50) | | DVS ON (67.5:67.5:67.5) | |
|---|---|---|---|---|---|---|---|
| | SUPPLY VOLTAGE | ACTIVE (1:3:6) | IDLE (0:3:6) | ACTIVE (1:6:6) | IDLE (0:6:6) | ACTIVE (6:6:6) | IDLE (0:6:6) |
| IARM | 1.30 | 68.4 | 31.8 | 54.8 | 19.6 | 20.8 | 7.6 |
| IINTERNAL | 1.30 | 88.4 | 87 | 63.8 | 62.5 | 63.8 | 62.5 |
| IALIVE | 1.30 | 1.78 | 1.61 | | | | |
| IPLL | 1.30 | 5.44 | 5.44 | | | | |
| I12V [mA] | | 164.02 | 125.84 | 118.6 | 82.1 | 84.6 | 70.1 |
| IMOP | 3.30 | 16.7 | 3 | 16 | 2.5 | 16 | 2.5 |
| IOP+ADC+RTC | 3.30 | 15 | 15.7 | 9.5 | 9.8 | 9.5 | 9.8 |
| I33V [mA] | | 31.7 | 18.07 | 25.5 | 12.3 | 25.5 | 12.3 |
| TOTAL POWER [mW] | | 317.84 | 223.22 | 238.33 | 147.32 | 187.89 | 129.44 |
| mW/MHz(@MOP3.3V) [mW/MHz] | | 0.79 | 0.36 | 0.60 | 0.37 | 0.47 | 0.32 |

ELECTRONIC DEVICES AND OPERATIONAL METHODS THAT CHANGE CLOCK FREQUENCIES THAT ARE APPLIED TO A CENTRAL PROCESSING UNIT AND A MAIN SYSTEM BUS

CROSS-REFERENCE TO RELATED APPLICATIONS

This U.S. non-provisional patent application claims priority under 35 U.S.C. § 119 of Korean Patent Application 2004-0043009, filed on Jun. 11, 2004, the entire contents of which is hereby incorporated by reference,

FIELD OF THE INVENTION

The present invention relates to electronic devices and operational methods therefor. More particularly, the present invention relates to electronic devices that include a central processing unit (CPU), a main system bus coupled to the CPU and a secondary or peripheral bus to which peripheral devices operating at generally a lower speed are coupled.

BACKGROUND OF THE INVENTION

Advances in technology have provided electronic devices such as battery-powered and/or mobile electronic devices, personal digital assistants (PDA) and laptop or notebook computers with an increased integration level and computing power. As portable devices generally draw power from one or more batteries, various power management or power conservation techniques have been implemented in order to increase or maximize work time of the portable devices. Particularly, reducing power consumption of a central processing unit (CPU) that generally has the highest integration level may be desirable in decreasing system power consumption. In addition, it may be desirable to modify the power consumption of the CPU according to an operational mode of the CPU, which determines an operation mode of the electronic device.

The operational mode of the CPU has an active mode (or a normal mode) and an idle mode (or a standby mode). In a general portable device, the work time in the idle mode may be above 90% of total work time, on average. Therefore, to reduce power consumption, the current consumption in the idle mode may be reduced. A method of reducing the power consumption in the idle mode may be desirable because the overall system operation may not be affected when operated with a reduced performance level in the idle mode, whereas the system performance may be a major concern in the active mode.

FIG. 1 is a schematic view illustrating an exemplary configuration of an electronic device, such as a portable device.

Referring to FIG. 1, the device 100 generally includes a central processing unit (CPU) 100, a main system bus 120 coupled to the CPU 100 and a secondary bus (or a peripheral bus) 140 to which a low-speed peripheral device 170 is coupled. The main system bus 120 is coupled to the secondary bus 140 through a bus bridge 130 and slave devices 160 and 170 are coupled to the main system bus 120 and the secondary bus 140, respectively. When the mobile device is to be equipped with a display to represent images, a display device 150 may be connected to the system bus 120 or the secondary bus 140 as the slave device. In FIG. 1, the display device 150 is shown connected to the main system bus 120.

Based on a given clock division ratio of each component device, a predetermined reference clock frequency may be divided and provided to the respective devices of the mobile device 100 as an operation clock frequency. The component elements shown in FIG. 1 may be all integrated into a single chip to reduce or minimize the entire system size and power consumption. Alternatively, one or more of the component elements may be implemented on a separate chip. For example, in an S3c2440 CPU having an ARM920T core of Advanced RISC Machines (ARM) Co., most of the components are implemented on a single chip.

One method of decreasing the current consumption in the idle mode of the CPU is to power off a clock frequency of the CPU. Namely, in the idle mode, the clock frequency applied to the CPU may be set to be '0'. However, this method may be problematic since the clock frequencies of the main system bus and the secondary bus remain the same so that the amount of reduced current of the entire system may be minor. Moreover, if the clocks of the main system bus and the secondary bus are also powered off in the idle mode, the slave devices connected to the bus may not operate properly. Particularly, in the display devices, which periodically refresh the screen in each refresh cycle, clock management may need to be cautiously performed so as not to affect a normal display of the display devices.

SUMMARY OF THE INVENTION

An electronic device that includes a central processing unit (CPU) and a main system bus may be operated, according to exemplary embodiments of the present invention, by operating the central processing unit at a first clock frequency and operating the main system bus at a second clock frequency that is lower than the first clock frequency, responsive to the electronic device being in an active mode. Both the central processing unit and the main system bus are operated at a third clock frequency that is lower than the second clock frequency, responsive to the electronic device being in an idle mode. Moreover, in some embodiments, an operating voltage of the central processing unit is decreased responsive to the electronic device being in the idle mode.

Methods of operating an electronic device that includes a CPU and a main system bus, according to other embodiments of the present invention, decrease an operational clock frequency of the CPU from a first clock frequency and of the main system bus from a second clock frequency that is lower than the first clock frequency, to a third clock frequency that is lower than the second clock frequency, and decrease an operating voltage of the CPU, responsive to an operational mode of the CPU switching to an idle state. In other embodiments, the operational clock frequency of the CPU and of the main system bus are increased from the third clock frequency to the first clock frequency and to the second clock frequency, respectively, and the operating voltage of the CPU is increased, responsive to the operational mode of the CPU switching to an active mode.

In some embodiments, the sequence of decreasing the operational clock frequency of the CPU and of the main system bus may be reversible. Similarly, the sequence of increasing the operational clock frequency of the main system bus and of the CPU also may be reversible. Additionally, the decreasing and/or increasing of the operational clock frequencies may be performed during an interrupt service routine that may be generated in synchronization with a vertical synchronization signal of a display, so as not to affect an image quality of the display.

Electronic devices according to exemplary embodiments of the present invention include a central processing unit, a main system bus, a display and a controller. The controller may be embodied using hardware and/or software, and is configured to operate the central processing unit at a first clock frequency and to operate the main system bus at a second clock frequency that is lower than the first clock frequency, responsive to the electronic device being in an active mode. The controller may be further configured to operate both the central processing unit and the main system bus at a third clock frequency that is lower than the second clock frequency, responsive to the electronic device being in an idle mode. The display operates at a same clock frequency independent of the electronic device being in the active mode or the idle mode. In some embodiments, the same clock frequency corresponds to the second clock frequency divided by an integer. The controller may also decrease an operating voltage of the central processing unit responsive to the electronic device being in the idle mode.

Electronic devices according to other embodiments of the present invention include a CPU, a main system bus and at least one memory device that is configured to store programs executable by the CPU. At least one of the programs is configured to decrease an operational clock frequency of the CPU from a first clock frequency and of the main system bus from a second clock frequency that is lower than the first clock frequency, to a third clock frequency that is lower than the second clock frequency, and to decrease an operating voltage of the CPU, responsive to an operational mode of the CPU switching to an idle mode. At least one of the programs is further configured to increase the operational clock frequency of the CPU and of the main system bus from the third clock frequency to the first clock frequency and to the second clock frequency, respectively, and to increase the operating voltage of the CPU, responsive to the operational mode of the CPU switching to an active mode. The order of increasing and/or decreasing the operational clock frequencies may be reversed, as was described above. The third clock frequency also may be provided to a secondary bus.

BRIEF DESCRIPTION OF THE DRAWINGS

FIG. 7 is a table showing a potential effect of decreasing power consumption according to exemplary embodiments of the present invention.

DETAILED DESCRIPTION

Figure 1:
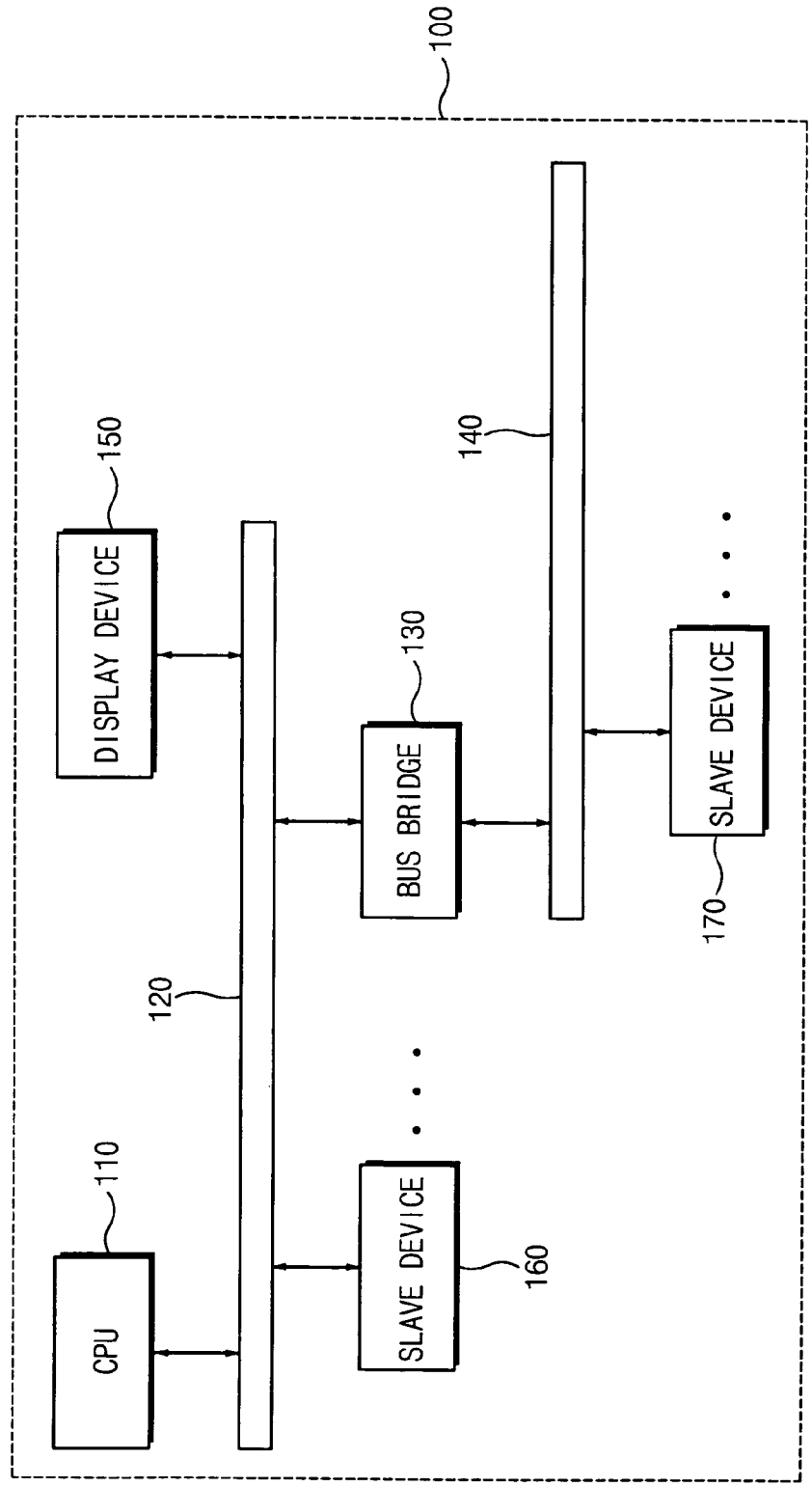
FIG. 1 is a block diagram illustrating a conventional configuration of an electronic device.

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "responsive" or "in response to" another element, it can be directly responsive or in response to the other element or intervening elements may be present. In contrast, the term "directly" means there are no intervening elements present. As used herein, the term "and/or"includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first frequency could be termed a second frequency, and, similarly, a second frequency could be termed a first frequency without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present invention is described in part below with reference to block diagrams and flowcharts of methods, systems and/or computer program products according to embodiments of the invention. It will be understood that a block of the block diagrams or flowcharts, and combinations of blocks in the block diagrams or flowcharts, may be implemented at least in part by computer program instructions. These computer program instructions may be provided to one or more enterprise, application, personal, pervasive and/or embedded computer systems, such that the instructions, which execute via the computer system(s) create means, modules, devices or methods for implementing the functions/acts specified in the block diagram block or blocks. A computer program according to embodiments of the invention comprises a computer usable storage medium having computer-readable program code embodied therein. Combinations of general purpose computer systems and/or special purpose hardware also may be used in other embodiments.

These computer program instructions may also be stored in memory of the computer system(s) that can direct the computer system(s) to function in a particular manner, such that the instructions stored in the memory produce an article of manufacture including computer-readable program code which implements the functions/acts specified in block or blocks. The computer program instructions may also be loaded into the computer system(s) to cause a series of operational steps to be performed by the computer system(s) to produce a computer implemented process such that the instructions which execute on the processor provide steps for implementing the functions/acts specified in the block or blocks. Accordingly, a given block or blocks of the block diagrams and/or flowcharts provides support for methods, computer program products and/or systems (structural and/or means-plus-function).

It should also be noted that in some alternate implementations, the functions/acts noted in the flowcharts may occur out of the order noted in the flowcharts. For example, two blocks shown in succession may in fact be executed substantially concurrently or the blocks may sometimes be executed in the reverse order, depending upon the functionality/acts involved. Finally, the functionality of one or more blocks may be separated and/or combined with that of other blocks.

Figure 2:
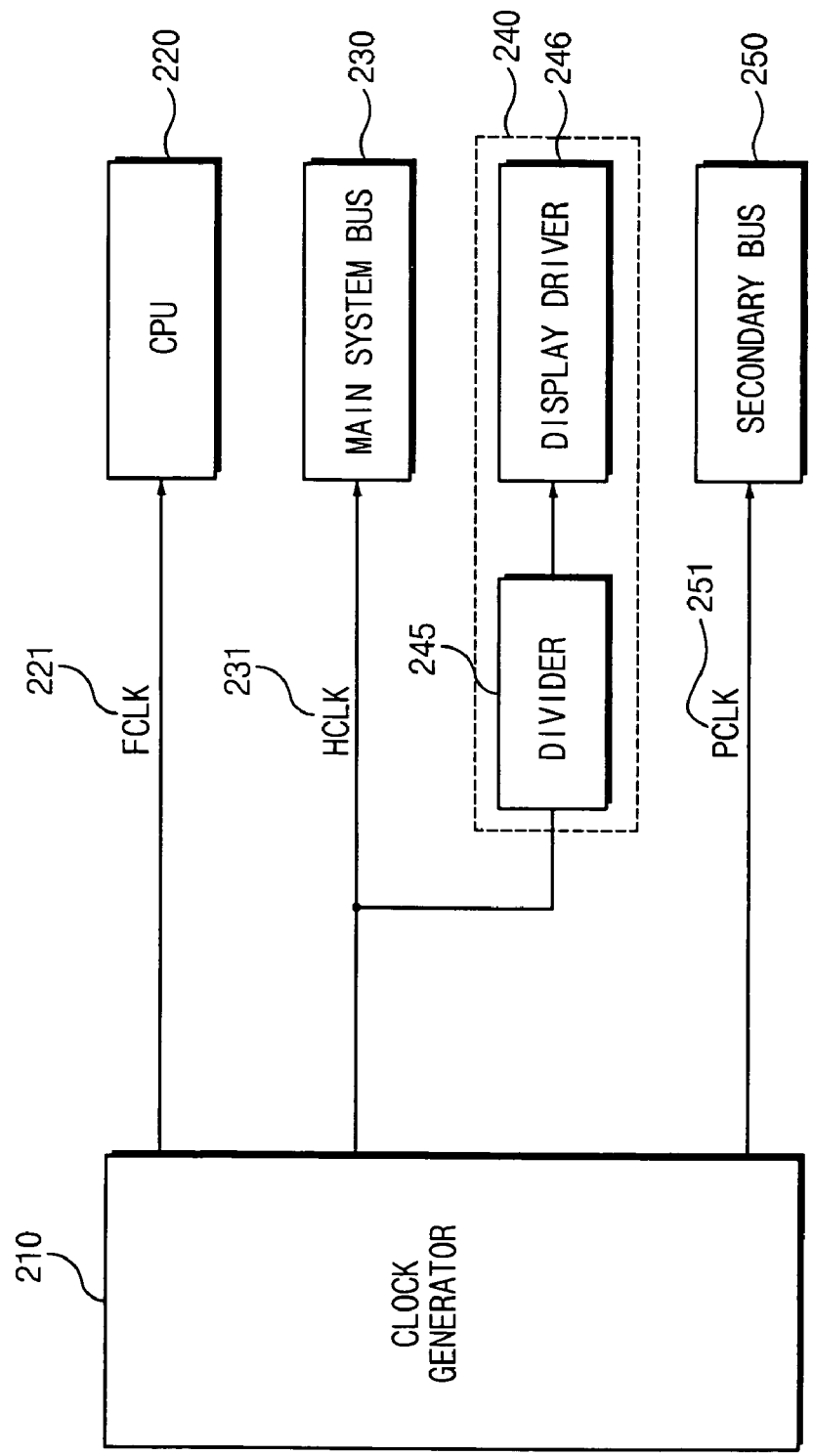
FIG. 2 is a block diagram illustrating clock division of an electronic device according to exemplary embodiments of the present invention.

FIG. 2 shows an example of clock management of an electronic device, according to exemplary embodiments of the present invention. The electronic device may be a portable (mobile) device where a processor chip ARM920T of Advanced RISC Machines (ARM) Co. is adopted.

Based on a predetermined reference clock source, a clock generator 210 provides a CPU 220, a main system bus 230, a secondary bus 250 and a display device 240 with clocks through a given clock division ratio of a multiplier and/or a divider. FCLK 221 represents a clock provided to the CPU 220 and HCLK 231 represents a clock provided to the main system bus. PCLK 251 represents a clock provided to the secondary bus 250. When the ARM920T core is used with the CPU 220, the HCLK 231 is one third of the frequency of the FCLK 221 and the PCLK 251 is a half of the frequency of the HCLK. Therefore, when a system operates at the frequency of 400 MHz for FCLK 221, the HCLK 231 has a frequency of 133 MHZ and the PCLK has a frequency of 67.5 MHz. Namely, a clock division ratio between the FCLK, HCLK and PCLK is FCLK: HCLK: PCLK=1:3:6.

The clock HCLK provided to the display device 240 is again divided by a divider 245 with a predetermined division ratio and provided to a display driver 246, etc., of the display device 240. This division is provided because an internal operation clock frequency for the display device 240 may be different from a clock frequency provided from an external service. FIG. 2 is only an illustrative example of the clock management and, therefore, the clock management may be set in different ways according to system architecture.

The main system bus 230 and the secondary bus 250 in FIG. 2 may generally adopt an advanced microcontroller bus architecture (AMBA) bus that are used for embedded applications such as a mobile device (e.g., PDA) when a processor chip developed by ARM Co. is used with the CPU 220 of the mobile device. However, it is noted that any other type of bus may be utilized as the main system bus 230 and/or the secondary bus 250.

The AMBA bus may include an advanced high-performance bus (AHB), an advanced system bus (ASB) and an advanced peripheral bus (APB) that have different features of their own. For instance, the AHB bus and the ASB bus are used as a system bus that connects the CPU with slave devices operating at generally higher speed. The APB bus connects the low-speed slave devices with the CPU. The APB bus has relatively simple architecture and protocol, and consumes lower current compared with the AHB bus and ASB bus. In the description that follows, it is assumed that the AHB bus is used for the main system bus 230 and the APB bus is used for the secondary bus.

The aforementioned CPU developed by ARM supports a technique known as dynamic voltage scaling (DVS). Using the DVS technique, the operation clock frequency of the CPU is adjusted to match the operation clock frequency of the main system bus so as to reduce an input voltage of the CPU. The technique may be referred to by different names, but herein, the term 'DVS' is defined as functionality that matches the operation clock frequency of the CPU with the operation clock frequency of the main system bus. One of the purposes of using the DVS technique, for example, is maintaining a normal operation of the system when the FCLK of 400 MHz is decreased to the HCLK of 67.5 MHz.

Figure 3:
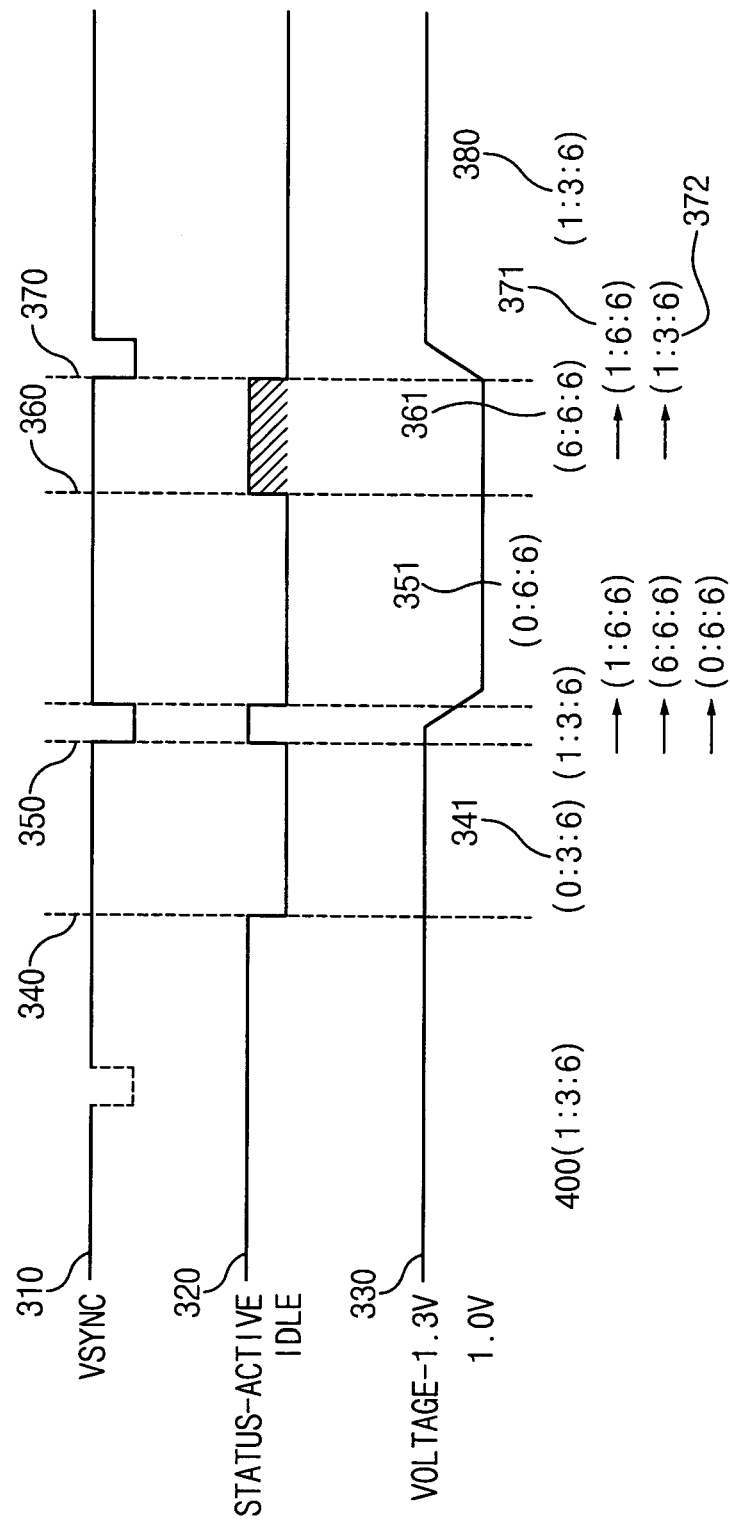
FIG. 3 is a timing diagram illustrating performing a reduced power mode of an electronic device according to exemplary embodiments of the present invention.

FIG. 3 is a timing diagram illustrating a method of performing a reduced power mode of an electronic device according to an exemplary embodiment of the present invention.

VSYNC 310 in FIG. 3 is a vertical synchronization interrupt generated in every refresh cycle of the display device, for example, a liquid crystal display. Hereinafter, the display device of exemplary embodiments will be referred to as a liquid crystal display device for the purpose of illustration. When the display device has a refresh rate of 60 Hz and does not use an interlace scanning method, the vertical synchronization interrupt is generated in every 1/60 second (i.e., 16.6 ms). The VSYNC interrupt allows the CPU to perform desired processing between a present frame scanning and a next frame scanning.

STATUS 320 represents an operation mode of the CPU. The operation mode of the CPU may have the active mode and the idle mode as described above. An operating voltage 330 represents the operating voltage of the CPU. In FIG. 3, the CPU has two operating voltages of about 1.3V and about 1.0V for the purpose of illustration.

In addition, division ratios 341, 351, 361, 371, 372 and 380 show variations in the division ratio of the clock frequency.

At a first time point 340, the operational mode of the CPU is switched into the idle mode. Generally, a timer may determine whether the operational mode of the CPU has transitioned. A method of determining an operational status of the CPU may vary according to the CPU type/model.

At the first time point 340, a clock division ratio in the active mode is changed from 1:3:6 to 0:3:6 as the CPU clock is turned off at the first time point 340. Namely, the CPU enters into the idle mode at the first time point 340. However, the reduced power mode according to some exemplary embodiments of the present invention is not performed at the first time point 340. At the first time point 340, the VSYNC interrupt is enabled and the reduced power mode is performed when an immediately next VSYNC interrupt is generated (i.e., second time point 350 in FIG. 3).

As described above, the VSYNC interrupt is generated at the second time point 350. The CPU then temporarily transitions to the active mode by the generated interrupt and the division ratio of clock frequencies of respective component devices is temporarily returned back to 1:3:6 so that an interrupt service routine for the VSYNC interrupt may be performed.

First, the clock frequency HCLK of the main system bus is reduced by one half. When the HCLK is reduced by one half, the power consumption is reduced by about 20%. Generally, in a S3C2440A CPU that is an ARM processor operating at 400 MHz, a desirable division ratio such that the CPU achieves the maximum performance may be FCLK:HCLK: PCLK=1:3:6. Therefore, when the FCLK is 400 MHz, the HCLK is about 133 MHz and the PCLK is about 67.5 MHz. To reduce the power consumption of the CPU that operates at about 400 MHz, the clock division ratio may be changed to FCLK:HCLK:PCLK=1:6:6. Then, the FCLK, HCLK and PCLK may have frequencies of about 400 MHz, about 67.5 MHz and about 67.5 MHz, respectively.

Next, the DVS functionality of the CPU is activated. In response to the activation of the DVS, the FCLK may be synchronized with the HCLK. Namely, the clock division ratio of 1:6:6 is changed to 6:6:6 according to the activation of the function of DVS.

Finally, the operating voltage of the CPU is reduced. In one embodiment, the operating voltage may be reduced from 1.2V~1.3V to about 1.0V. When only the interrupt service routine is performed and any other system services are not to be performed, the CPU enters into the idle mode. In this case, the operation clock frequency of the CPU decreases to zero so that the clock division ratio becomes FCLK:HCLK:PCLK=0:6:6 (i.e., 0 MHz:67.5 MHz:67.5 MHz).

Compared with the conventional clock division ratio 341 (i.e., 0:3:6) in the idle mode, the clock division ratio 351 (i.e., 0:6:6) in the idle mode according to an exemplary embodiment has an effect of reducing current as the clock frequency of the main system bus is reduced by one half. The state where the clock division ratio is changed to 0:6:6 in the idle mode is indicative of the reduced power mode according to an exemplary embodiment of the present invention. When a system is put into the reduced power mode, the VSYNC interrupt is disabled so that the VSYNC interrupt may not awake the CPU from the idle mode.

At a third time point 360, the CPU transitions to an active state (the term "active state" and "idle state" may sometimes be used herein as alternatives for active mode and idle mode, respectively). The CPU may be switched to the active state by the timer or generation of an interrupt other than the VSYNC interrupt. Although the CPU is temporarily switched to the active state at the third time point 360, the clock division ratio 361 at the third time point is 6:6:6 since the dynamic voltage scaling is activated and the clock frequency of the main system bus is reduced by one half.

Returning the system to the normal operation is also performed in the interrupt service routine of the VSYNC interrupt similar to entering the reduced power mode is performed in the interrupt service routine.

Similar to steps performed at the first and second time points 340 and 350, the VSYNC interrupt is enabled at the third time point 360 and returning to the normal operation is performed at a fourth time point 370 when an immediately next VSYNC interrupt is generated.

When the VSYNC interrupt calls an interrupt service routine at the fourth time point 370, the operating voltage of the CPU is returned back to a normal operating voltage. In one embodiment, the operating voltage is raised to about 1.2V to 1.3V. Then the dynamic voltage scaling of the CPU is disabled so that the operation clock frequency of the CPU may return back to a normal FCLK level. Therefore, the clock division ratio 371 may be 1:6:6. The clock frequency HCLK of the main system bus is raised from the reduced level by one half to the normal level. Therefore, the clock division ratio 372 is changed to 1:3:6 so that the system may return to the normal operation.

The reason why steps of entering the reduced power mode and returning to the normal operation (e.g., adjustment of the clock division ratio with respect to HCLK, operating voltage of the CPU, activating the DVS functionality of the CPU, etc.) are performed in the VSYNC interrupt service routine, according to some embodiments of the invention, is because there may be constraints in reducing the HCLK of the main system bus.

As shown in FIG. 2, the display device 240 is one of slave devices that uses an internally divided clock based on the received HCLK clock. For example, in the S3C2440 processor developed by ARM, the display device (e.g., LCD device) may use clock signals that are divided from the HCLK. In such a case, when the HCLK is reduced by one half, stripes may be seen on the screen of the display device 240. Therefore, the HCLK may be changed after a display of an entire screen is complete and before the next screen is displayed.

Figure 4:
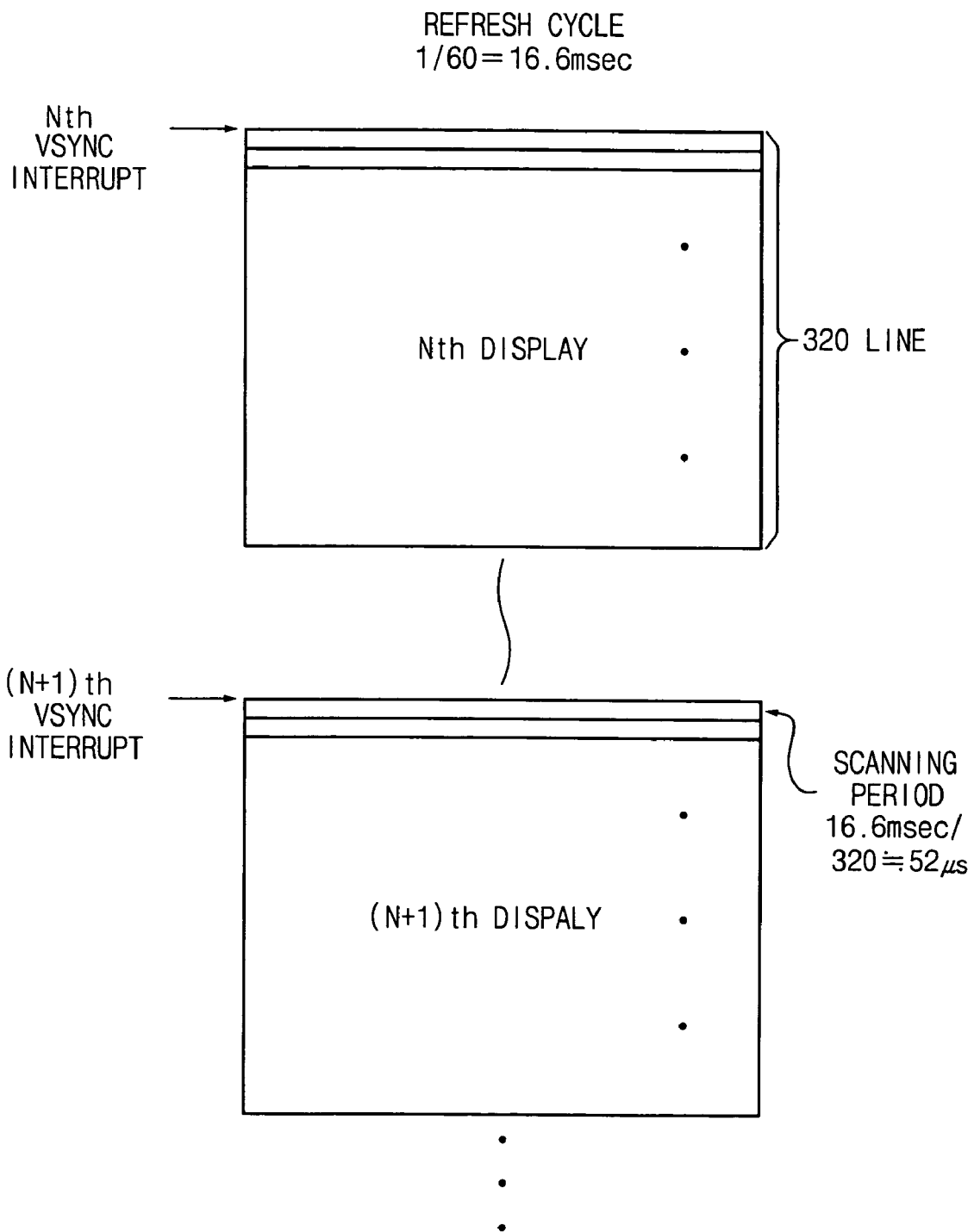
FIG. 4 is a schematic view illustrating a refresh cycle of a display device.

FIG. 4 is a schematic view illustrating a refresh cycle of a display device.

Referring to FIG. 4, when the display device (e.g., LCD device) has a refresh rate of about 60 Hz and performs a non-interlaced scanning, the VSYNC is generated in a period of about 1/60 second, i.e., 16.6 ms. In FIG. 4, an n-th VSYNC interrupt and an n+1 VSYNC interrupt are generated to refresh an n-th display screen and an n+1-th display screen, respectively. In a PDA such as a Windows CE/PocketPC based handheld computer, row lines are generally 320 lines. Accordingly, in case where a sequential scan is used, a scanning period of a horizontal line is about 16.6 ms/320, i.e., about 52 us. Since the Windows CE based system has a latency of about 10 us, the system will normally operate when the HCLK is changed within about 40 us. Namely, transition in the operational mode of the system in response to a screen refresh may occur in the VSYNC interrupt service routine before a horizontal synchronization signal for a first line is generated.

However, when the HCLK is reduced by one half, the display device may need to be notified of the reduction in the HCLK so that the internal division ratio at which the HCLK is again divided to be provided to the display driver may be changed and thereby does not affect the normal operation of the display device. For example, when the internal division ratio of the about 133 MHz HCLK of the display device is designated as 4, the internal division ratio may be changed to 2 when the HCLK decreases to about 67.5 MHz, so as not to affect the normal operation of the display device.

The following exemplary pseudo code may be used to implement an OEM adaptation layer (OAL) of a board support package (BSP) for porting windows CE on a mobile platform. The OAL is a layer of code that resides between the kernel and the hardware platform, wherein the OAL is created by windows CE to adapt the windows CE to a specific hardware platform.

Pseudo Code 1

```
if (IntPendVal == INTSRC_LCD)
{
    if (IDLEflag == FALSE)
    {
    DisableLCDInterrupt( );
    ClearLCDInterrupt( );
    CurrStateIdle = FALSE;
    DisableLCDOutput( );
    ChangeVoltage(V130);
    Delay(400);
    DVS_OFF( );
    CLKDIV136( );
    SetLCDClock(HCLK);
    EnableLCDOutput( );
    }
    else
    {
    DisableLCDInterrupt( );
    ClearLCDInterrupt( );
    CurrStateIdle = TRUE;
    DisableLCDOutput( );
```

```
-continued
    CLKDIV166( );
    DVS_ON( );
    ChangeVoltage(V100);
    SetLCDClock(HCLK/2);
    EnableLCDOutput( );
        }
}
```

Pseudo Code 2

```
            void CPUEnterIdle( )
            {
            if (CurrStateIdle == TRUE)
                DisableLCDInterrupt( );
            else
                EnableLCDInterrupt( );
            fInterruptFlag = FALSE;
            IDLEflag = TRUE;
            INTERRUPTS_ON( );
            SetCPUIdleMode( );
            while(!fInterruptFlag) { }
            SetCPUActiveMode( );
            IDLEflag = FALSE;
            if (CurrStateIdle == FALSE)
                DisableLCDInterrupt( );
            else
                EnableLCDInterrupt( );
            }
```

The pseudo code 1 is an exemplary embodiment of code in an interrupt handler that is embodied in a file armint.c of the BSP of windows CE.Net. The pseudo code 2 is an exemplary operational code that is to be performed when the operational mode of the CPU embodied in a file timer.c of BSP of windows CE.Net is switched to the active mode or the idle mode.

A CPUEnterIdle( ) function is called by a system kernel when the timer detects entering the idle state. When the CPUEnterIdle( ) function is invoked, a CurrStateIdle variable is checked first to determine a current operational mode of the system. When the CurrStateIdle variable is TRUE, the system is in the reduced power mode. Namely, a power reduction technique according to an exemplary embodiment of the present invention is already applied to the system so that the VSYNC interrupt maintains a disabled state. In other words, when the CurrStateIdle variable is TRUE, a DisableLCDInterrupt( ) function is executed to maintain the VSYNC interrupt in the disabled state.

Conversely, when the CurrStateIdle variable is FALSE, the system enters the idle mode from the active state so that the VSYNC is enabled so as to perform the reduced power mode. Namely, an EnableLCDInterrupt( ) function is executed to enable the VSYNC interrupt.

As described above, the CurrStateIdle variable in the pseudo code 2 is used to determine in which operational mode the CPU is currently involved. Alternatively, the operational mode of the CPU may be determined by checking whether the dynamic voltage scaling functionality of the CPU is activated or not. That is, when the DVS functionality is activated, the CPU is determined to be in the reduced power mode and when the DVS functionality is not activated, the CPU is determined not to be in the reduced power mode. It may be more desirable to use the DVS than the CurrStateIdle variable that is a global variable, when the activation of DVS is detectable.

An IDLEflag variable is set to be TRUE so that the reduced power mode may be performed in the interrupt service routine for the VSYNC interrupt that is generated first after the CPUEnterIdle( ) function is performed. That is, the IDLEflag variable is indicative of performing the reduced power mode in the interrupt service routine for the VSYNC interrupt. Next, the interrupt is activated by an INTERRUPTS_ON( ), and a SetCPUIdleMode( ) function is called to place the CPU in the idle mode. The entering the idle mode is performed at the first time point 340 in FIG. 3. Steps performed in the SetCPUIdleMode( ) function are dependent on the CPU type/model and the system and may be independent of exemplary embodiments of the present invention. In general, steps of storing a current operation mode of the CPU, placing a memory device in a refresh mode, decreasing the operation clock of the CPU to zero, etc may be performed in the SetCPUIdleMode( ) function.

When CPUEnterIdle( ) is performed, the if-statement in the pseudo code 1 is false since the IDLEflag parameter is set to be TRUE in the CPUEnterIdle( ). Therefore, when the interrupt is activated by the INTERRUPTS_ON( ), an else-statement in the pseudo code 1 is performed by the VSYNC interrupt that is generated first after the CPUEnterIdle( ) is called.

Therefore, the clock of the main system bus is reduced by one half by a CLKDIV166( ) function and the operation clock of the CPU is set to be the clock of the main system bus by a DVS_ON( ) function. In addition, the operational voltage of the CPU is reduced from 1.3V to 1.0V by a ChangeVoltage (V100) function. Next, as described above, since the HCLK is reduced by one half, a SetLCDClock(HCLK/2) function is invoked to send a notification to the display device to restore the original clock division ratio with respect to the HCLK.

In order to reduce or prevent stripes from being seen on the screen of the LCD display device, the above steps may be performed between the invocations of the DisableLCDOutput( ) and EnableLCDOutput( ) so that the display of the LCD device may not be performed during such time period. As described above, the above steps may be performed within about 40 us.

When the CPU is under a certain condition in the pseudo code 2, for example, the CPU enters an active mode by an interrupt other than the VSYNC interrupt, an fInterruptFlag is set to be TRUE to exit the while(!fInterruptFlag) loop so that a SetCPUActiveMode( ) function is performed. As described above, steps performed in the SetCPUIdleMode( ) are dependent on the CPU type/model and the system, and may be independent of exemplary embodiments of the present invention.

Next, the IDLEflag is set to be FALSE so that the CPU is notified to return to the normal operational mode. Therefore, entering a normal operational mode is performed in the interrupt service routine called by the VSYNC interrupt that is generated first after the IDLE flag is set to be FALSE. Therefore, when the interrupt service routine is performed by the first generated VSYNC interrupt, the if-statement in the pseudo code 1 is selected in contrast to the step of entering the reduced power mode since the IDLEflag is FALSE. The following steps are performed in a reverse order compared with the steps performed in entering the reduced power mode.

A ChangeVoltage(V130) raises the operating voltage to 1.3V and a Delay(400) waits for the operating voltage to increase to 1.3V while providing delay time required to increase the operating voltage. The numerical value 400 may vary in real implementations because the delay time may depend on system characteristics involved. Finally, the DVS functionality of the CPU is deactivated by a DVS_OFF( ) so that the clock of the CPU is not synchronized with the clock of the main system bus and the FCLK is adopted as the operation clock of the CPU. A CLKDIV136( ) restores the original clock frequency of the main system bus and a SetL-CDClock(HCLK) notifies the display device to return to an original clock division ratio. The above steps are performed between DisableLCDOutput( ) and EnableLCDOutput( ) in order to prevent stripes from being shown on the screen of the display device, and the steps may be performed within about 40 us, as descried above.

Figure 5:
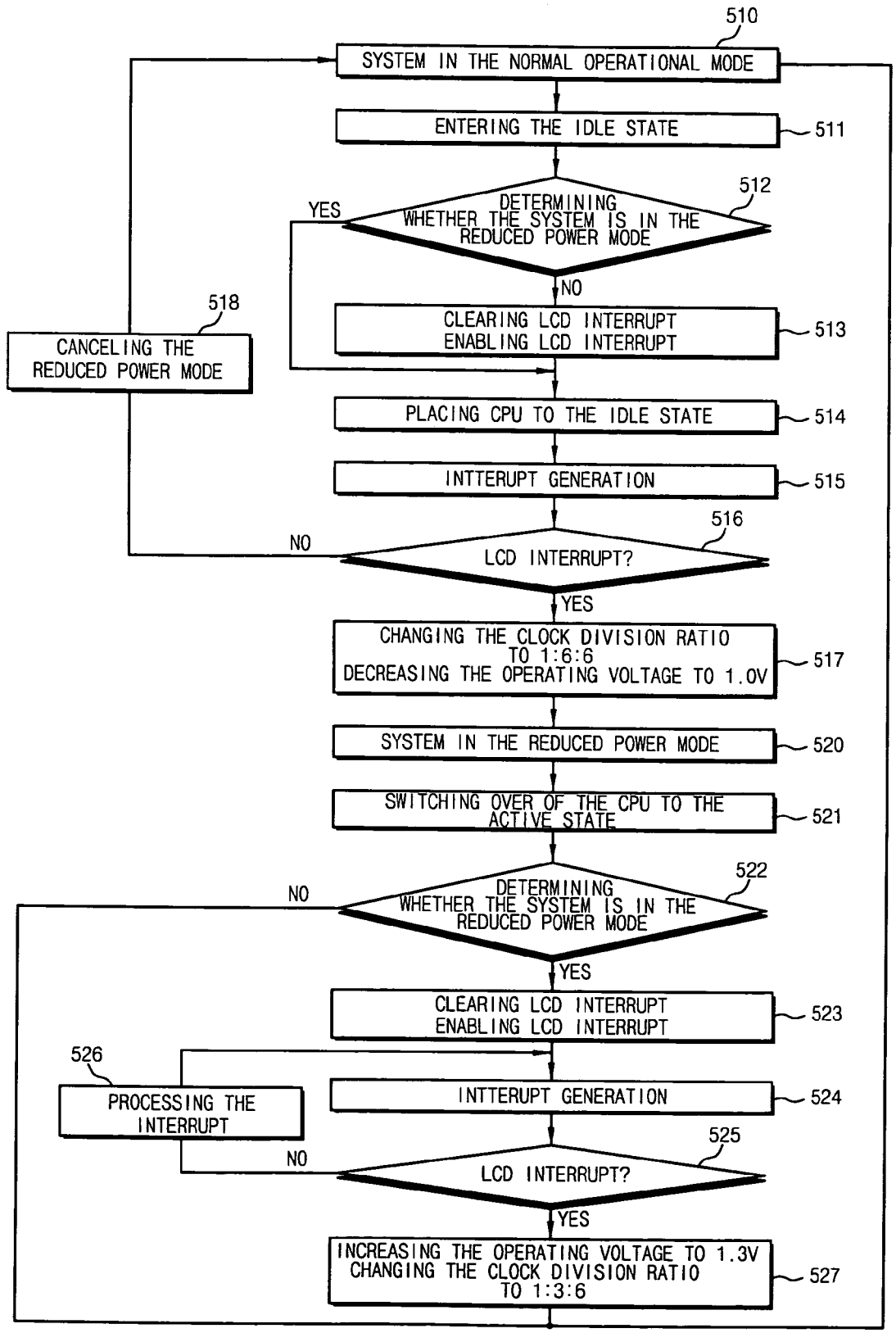
FIG. 5 is a flowchart illustrating operations for entering a reduced power mode and returning to a normal operation according to exemplary embodiments of the present invention.

FIG. 5 is a flowchart illustrating operations for entering a reduced power mode and returning to the normal operation according to exemplary embodiments of the present invention. Operations of FIG. 5 may be performed by a controller that includes general purpose hardware, special purpose hardware and/or one or more stored programs, including a general purpose processor such as the CPU, operating under stored program control.

When the CPU in the normal operational mode where the power reduction technique according to an exemplary embodiment is not adopted (Block 510) is switched to the idle mode, the system kernel calls the CPUEnterIdle( ) function (Block 511). Whether the system is currently placed in the reduced power mode is determined in Block 512 by means of, for example, checking whether the DVS functionality is utilized or not. As described above with reference to the pseudo code 2, a parameter such as the CurrStateIdle may be checked instead of the activation of the DVS functionality to determine the current operational mode of the CPU.

When the DVS functionality is activated (or the CurrStateIdle is true), the system is already in the reduced power mode, thereby proceeding to Block 514. When the DVS functionality is deactivated (or the CurrStateIdle is false), Block 513 of clearing and enabling the LCD interrupt is performed so as to enter into the reduced power mode.

In Block 514, the SetCPUIdleMode( ) is performed to place the CPU into the idle mode. In Block 515, the interrupt is generated in the idle mode, which can be similar to the second time point in FIG. 3. Blocks 516 and 517 are performed in the interrupt service routine. When the interrupt generated in Block 516 corresponds to the LCD interrupt, Block 517 is performed to enter the reduced power mode. However, when the generated interrupt is not the LCD interrupt, processing the interrupt is performed and entering the reduced power mode is canceled. Additionally, the LCD interrupt is disabled (Block 518). Block 518 corresponds to an operation performed by the SetCPUActiveMode( ) of the pseudo code 2.

In Block 517, the generated LCD interrupt is cleared and an output of the LCD display is disabled. In addition, the clock of the main system bus reduces by one half to change the clock division ratio to 1:6:6 and the DVS functionality is activated. The operating voltage of the CPU is decreased to about 1.0 V and an inner clock division ratio of the display device is changed. Finally, the output of the LCD device is enabled.

In Block 520, the system is put in the reduced power mode. When a predetermined condition is met, the SetCPUActiveMode( ) is performed to switch the CPU to the active state in Block 521. Whether the system is currently placed in the reduced power mode is determined in Block 522 similar to Block 512. Similar to Block 512, the current operational mode may be determined by means of checking whether the DVS functionality is activated or using the parameter such as the CurrStateIdle.

When the system is put in the reduced power mode, the LCD interrupt is enabled so as to return the CPU to the normal operational mode (Block 523). When the system is not in the reduced power mode, the system is already in the normal operational mode, thereby proceeding to the Block 510.

When the LCD interrupt is enabled in Block 523, the interrupt service routine (Blocks 525 and 527) is performed. When the generated interrupt is determined to be the LCD interrupt in Block 525, returning to the normal operation is performed in Block 527. When the generated interrupt is determined not to be the LCD interrupt, processing the interrupt is performed (Block 526).

In Block 527, the generated LCD interrupt is cleared and an output of the LCD display is disabled. Also, the operating voltage is increased to about 1.3V. After a time delay for the operating voltage to increase, the DVS functionality can be deactivated and the clock division ratio is returned back to 1:3:6. The inner clock division ratio of the display device is returned to its original clock division ratio and finally, the output of the LCD display is enabled. When Block 527 is performed, the system returns to the normal operation (Block 510).

Figure 6:
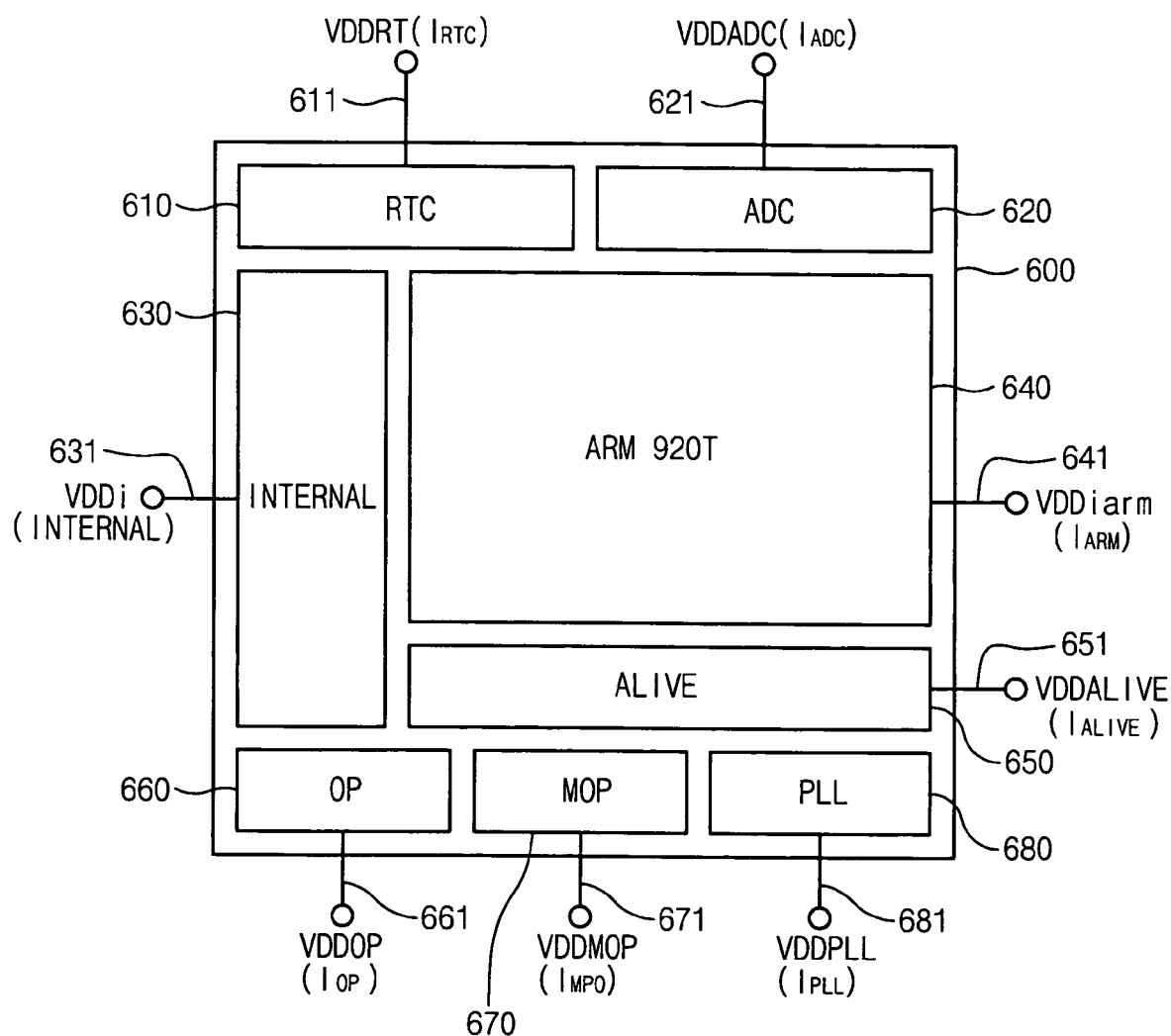
FIG. 6 is a block diagram of an electronic device illustrating a power supply that supplies power to each element of the electronic device according to exemplary embodiments of the present invention.

FIG. 6 is a block diagram illustrating an exemplary power supply of S3C2440 CPU and FIG. 7 is a table showing a potential effect of decreasing power consumption according to exemplary embodiments of the present invention. With reference to FIGS. 6 and 7, the potential effect of power reduction will be described.

The S3C2440 CPU 600 to which exemplary embodiments of the present invention may be applied includes an ARM920T core and peripheral devices that are integrated with the ARM920T core on a single chip. However, in other embodiments, one or more components may be implemented on a separate chip as described above.

In FIG. 6, an RTC 610 represents a real time clock and an ADC 620 represents an analog-to-digital converter. An OP 660 represents an input/output (I/P) port and a MOP 670 represents the input/output (I/P) port for the memory device. A PLL 680 represents a phase locked loop and an ALIVE 650 represents a component that always needs power to be supplied thereto regardless of the operational mode of the system, such as a reset block of the CPU and port status register. An Internal 630 represents inner core logic. The above components are supplied with current by VDDRTC 611, VDDADC 621, VDDi 631, VDDiarm 641, VDDAlive 651, VDDOP 661, VDDMOP 671 and VDDPLL 681, respectively. In case of the S3C2440 CPU 600, a voltage of about 1.2V is applied to the ARM920T core 640, Internal 630, Alive 650 and PLL 680 and a voltage of about 3.3V is applied to the OP 660, MOP 670, ADC 620 and RTC 610.

The table in FIG. 7 shows a predicted effect of the power reduction according to an exemplary embodiment of the present invention. $I_{ARM}$ represents a measured amount of current provided to the ARM core 640 in FIG. 6 and $I_{INTERNAL}$ is measured on an amount of current provided to the inner core logic 630 in FIG. 6. $I_{ALIVE}$ and $I_{PLL}$ are measured on amounts of current provided to the component ALIVE 650 and the PLL 680, respectively. The foregoing four components operate at about 1.2V voltage and a total amount of consumed current thereof is represented by $I_{1.2\,v}$. $I_{MOP}$, $I I_{OP}$, $I_{AC}$ and $I_{RTC}$ are measured on amounts of current provided to the components MOP 670, OP 660, ADC 620 and RTC 610, respectively. The foregoing four components operate at about 3.3V. A total amount of the current consumption of the four components is represented by $I_{3.3\,v}$. Therefore, the total amount (i.e., TOTAL POWER in FIG. 7) of the consumed current is a summation of $I_{1.2\,v}$ and $I_{3.3\,v}$.

First, the total amount of predicted current consumption conventionally will be calculated on the basis that the idle time has 94 percent of total run time as is generally regarded in the art. Conventionally, the clock division of the CPU clock changes from 1 to 0 when the CPU is switched from the active state into the idle state. Accordingly, the clock division ratio of the system components changes from 1:3:6 to 0:3:6 and vice versa and thus, the total current consumption ranges from about 223.22 mW (752) to about 317.84 mW (751). Therefore, the total current consumption is given by 317.84*0.06+223.22*0.94=about 228.90 mW.

When a power reduction technique is applied according to an exemplary embodiment of the present invention, not only the CPU clock changes from 1 to 0 but also the operation clock of the main system bus reduces by one half as the CPU is switched from the active state to the idle state. Therefore, the clock division ratio of the system changes from 1:3:6 to 0:6:6 and vice versa and, thus, the total predicted current consumption ranges from about 129.44 mW (753) to about 317.84 mW (751). Therefore, the total predicted current consumption is given by 317.84*0.06+129.44*0.94=about 140.74 mW. It is seen that the total predicted current consumption is reduced by about 38%. It is noted that the numerical value of the current reduction effect may vary since the percentage of the idle time may be varied according to an operating environment or usage of the system.

According to exemplary embodiments of the present invention, the clock frequency of the main system bus connected to the CPU is also reduced by one half, while, conventionally, only the operation clock is turned off when the CPU is put in the idle mode. Particularly, in an electronic device including a display device connected to the main system bus or the secondary bus, the power reduction technique of the exemplary embodiments may be performed in the interrupt service routine that is generated by the vertical synchronization signal of the display device so as not to affect a normal display and system operation.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of operating an electronic device that includes a Central Processing Unit (CPU) and a main system bus, the method comprising:
   decreasing an operational clock frequency of the CPU from a first clock frequency and of the main system bus from a second clock frequency that is lower than the first clock frequency, to a third clock frequency that is lower than the second clock frequency, and decreasing an operating voltage of the CPU, responsive to an operational mode of the CPU switching to an idle mode, wherein the switching of the operational mode of the CPU to an idle mode triggers the decreasing of the operational clock frequency of the CPU and of the main system bus; and
   increasing the operational clock frequency of the CPU and of the main system bus from the third clock frequency to the first clock frequency and to the second clock frequency, respectively, and increasing the operating voltage of the CPU, responsive to the operational mode of the CPU switching to an active mode,
   wherein the electronic device further includes a display and wherein increasing the operational clock frequency of the CPU and of the main system bus and increasing the operating voltage of the CPU are performed during an interrupt service routine generated in synchronization with a vertical synchronization signal of the display, and further wherein increasing the operational clock frequency of the CPU and of the main system bus and increasing the operating voltage of the CPU are performed during a horizontal scan period of the display.

2. A method according to claim 1 wherein the operational clock frequency of the CPU is increased after increasing the operational clock frequency of the main system bus.

3. A method according to claim 2 wherein increasing the operational clock frequency of the CPU comprises deactivating a dynamic voltage scaling functionality of the CPU.

4. A method according to claim 1 wherein operational clock frequency of the CPU is increased before increasing the operational clock frequency of the main system bus.

5. A method according to claim 1 wherein decreasing an operational frequency of the CPU from the first clock frequency and of the main system bus from the second clock frequency comprises:
   matching the operational clock frequency of the CPU with the operational clock frequency of the main system bus after decreasing the operational clock frequency of the main system bus to the third clock frequency.

6. A method according to claim 5 wherein matching the operational clock frequency of the CPU with the operational clock frequency of the main system bus comprises activating a dynamic voltage scaling functionality of the CPU.

7. A method according to claim 1 wherein decreasing an operational frequency of the CPU from the first clock frequency and of the main system bus from the second clock frequency comprises:
   decreasing the operational clock frequency of the main system bus to the third clock frequency after matching the operational clock frequency of the CPU with the operational clock frequency of the main system bus.

8. A method according to claim 1 wherein the electronic device further includes a secondary bus and wherein the method further comprises operating the secondary bus at the third clock frequency.

9. A method according to claim 8 wherein the secondary bus corresponds to an AMBA advanced Peripheral bus (APB).

10. A method according to claim 1 wherein the main system bus corresponds to an AMBA High-performance peripheral bus (AHB).

11. A method of operating an electronic device that includes a Central Processing Unit (CPU) and a main system bus, the method comprising:
    decreasing an operational clock frequency of the CPU from a first clock frequency and of the main system bus from a second clock frequency that is lower than the first clock frequency, to a third clock frequency that is lower than the second clock frequency, and decreasing an operating voltage of the CPU, responsive to an operational mode of the CPU switching to an idle mode, wherein the switching of the operational mode of the CPU to an idle mode triggers the decreasing of the operational clock frequency of the CPU and of the main system bus; and
    wherein the electronic device further includes a display and wherein the method further comprises providing the second clock frequency to the display; dividing the second clock frequency that is provided to the display; and providing the divided second clock frequency to a display driver; and
    further wherein decreasing the operational clock frequency of the CPU and of the main system bus and decreasing the operating voltage of the CPU are performed during an interrupt service routine generated in synchronization with a vertical synchronization signal of the display; and further wherein decreasing the operational clock frequency of the CPU and of the main system bus and decreasing the operating voltage of the CPU are performed during a horizontal scan period of the display.

12. A method according to claim 11, wherein decreasing an operational frequency of the CPU from the first clock frequency and of the main system bus from the second clock frequency comprises:

matching the operational clock frequency of the CPU with the operational clock frequency of the main system bus after decreasing the operational clock frequency of the main system bus to the third clock frequency.

13. A method according to claim 12 wherein matching the operational clock frequency of the CPU with the operational clock frequency of the main system bus comprises activating a dynamic voltage scaling functionality of the CPU.

14. A method according to claim 11, wherein decreasing an operational frequency of the CPU from the first clock frequency and of the main system bus from the second clock frequency comprises:

decreasing the operational clock frequency of the main system bus to the third clock frequency after matching the operational clock frequency of the CPU with the operational clock frequency of the main system bus.

15. A method according to claim 11, wherein the electronic device further includes a secondary bus and wherein the method further comprises operating the secondary bus at the third clock frequency.

16. A method according to claim 15, wherein the secondary bus corresponds to an AMBA advanced Peripheral bus (APB).

17. A method according to claim 11, wherein the main system bus corresponds to an AMBA High-performance peripheral bus (AHB).

* * * * *